(12) United States Patent
Hagimoto et al.

(10) Patent No.: US 8,347,604 B2
(45) Date of Patent: Jan. 8, 2013

(54) DEVICE FOR DETERMINING DETERIORATION OF CATALYST AND METHOD FOR DETERMINING DETERIORATION OF CATALYST

(75) Inventors: Taiga Hagimoto, Susono (JP); Daisuke Shibata, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/677,267

(22) PCT Filed: Mar. 31, 2009

(86) PCT No.: PCT/JP2009/056678
§ 371 (c)(1),
(2), (4) Date: Mar. 9, 2010

(87) PCT Pub. No.: WO2010/113269
PCT Pub. Date: Oct. 7, 2010

(65) Prior Publication Data
US 2012/0006002 A1    Jan. 12, 2012

(51) Int. Cl.
*F01N 3/00* (2006.01)
(52) U.S. Cl. ............... 60/277; 60/285; 60/295; 60/301
(58) Field of Classification Search .......... 60/277, 60/285, 295, 301
See application file for complete search history.

(56) References Cited

U.S. PATENT DOCUMENTS

| 7,134,273 | B2 * | 11/2006 | Mazur et al. ................ 60/286 |
| 8,263,031 | B2 * | 9/2012 | Gotan et al. ............ 423/213.2 |
| 2004/0040284 | A1 | 3/2004 | Upadhyay et al. |
| 2004/0040289 | A1 | 3/2004 | Mazur et al. |
| 2008/0264037 | A1 | 10/2008 | Takahashi et al. |
| 2008/0302085 | A1 | 12/2008 | Hinz et al. |
| 2009/0158716 | A1 | 6/2009 | Tsukamoto et al. |

FOREIGN PATENT DOCUMENTS

EP    1 154 131 A2    11/2001
(Continued)

OTHER PUBLICATIONS

International Search Report issued on Jun. 23, 2009 in International Application No. PCT/JP2009/056678 (with translation).

*Primary Examiner* — Thomas Denion
*Assistant Examiner* — Matthew T Largi
(74) *Attorney, Agent, or Firm* — Oliff & Berridge, PLC

(57) ABSTRACT

The degree of deterioration of a catalyst is obtained accurately in cases where a plurality of catalysts is disposed at an exhaust passage of an internal combustion engine. Under the assumption that the degree of deterioration of a catalyst which is disposed at a location upstream of an $NO_x$ selective reduction catalyst and has an oxidizing ability is at a predetermined value, the ratio of $NO_2$ in the $NO_x$ which inflows into the $NO_x$ selective reduction catalyst is estimated; the $NO_x$ removal rate of the $NO_x$ selective reduction catalyst is calculated a plurality of times at least until a local maximum value is obtained; and the degree of deterioration of the catalyst having an oxidizing ability is determined by comparison between the ratio of $NO_2$ observed when the $NO_x$ removal rate of the $NO_x$ selective reduction catalyst reaches the local maximum value and a reference value of the ratio.

8 Claims, 8 Drawing Sheets

FOREIGN PATENT DOCUMENTS

| | | |
|---|---|---|
| JP | A-2001-263048 | 9/2001 |
| JP | A-2004-100699 | 4/2004 |
| JP | A-2004-100700 | 4/2004 |
| JP | A-2005-023921 | 1/2005 |
| JP | A-2006-291742 | 10/2006 |
| JP | A-2007-315233 | 12/2007 |
| JP | A-2008-038737 | 2/2008 |
| JP | A-2008-523305 | 7/2008 |
| JP | A-2008-240577 | 10/2008 |
| JP | A-2008-274835 | 11/2008 |

* cited by examiner

DEVICE FOR DETERMINING DETERIORATION OF CATALYST AND METHOD FOR DETERMINING DETERIORATION OF CATALYST

TECHNICAL FIELD

The present invention relates to a device for determining deterioration of a catalyst and a method for determining deterioration of a catalyst.

BACKGROUND ART

Technologies for determining deterioration of an oxidation catalyst, which is based on the temperature of the oxidation catalyst observed when fuel is added to the oxidation catalyst disposed at an exhaust passage of an internal combustion engine, are known. (for example, see Patent Document 1.) However, the addition of fuel may cause release of the fuel into the atmosphere and lower fuel economy.

When determination of deterioration of an $NO_x$ selective reduction catalyst is carried out in cases where the $NO_x$ selective reduction catalyst is disposed at a location downstream of an oxidation catalyst, a more accurate determination is possible by taking the degree of deterioration of the oxidation catalyst into account. For example, in cases where determination of deterioration of the $NO_x$ selective reduction catalyst is carried out based on the $NO_x$ removal rate of the $NO_x$ selective reduction catalyst, the $NO_x$ removal rate varies depending on the ratio between the NO and $NO_2$ which inflow into the $NO_x$ selective reduction catalyst. Since this ratio between NO and $NO_2$ varies depending on the degree of deterioration of the oxidation catalyst, a decrease in the $NO_x$ removal rate of the $NO_x$ selective reduction catalyst might be due to deterioration of the oxidation catalyst. That is, it is important to determine which catalyst is deteriorated.

Patent Document 1: JP 2001-263048 A
Patent Document 2: JP 2005-23921 A
Patent Document 3: JP 2004-100700 A
Patent Document 4: Japanese Translated PCT Patent Application Laid-open No. 2008-523305

DISCLOSURE OF THE INVENTION

Problems to be Solved by the Invention

The present invention was made in view of the above-described problems and aims to provide a technology by which the degree of deterioration of a catalyst can be obtained accurately in cases where a plurality of catalysts is disposed at an exhaust passage of an internal combustion engine.

Means for Solving the Problems

To achieve the above-described purpose, the device of the present invention for determining deterioration of a catalyst employs the means below. That is, the device of the present invention for determining deterioration of a catalyst comprises:

an $NO_x$ selective reduction catalyst which is disposed at an exhaust passage of an internal combustion engine and selectively reduces $NO_x$ with a reducing agent;

a catalyst which is disposed at a location upstream of the $NO_x$ selective reduction catalyst and has an oxidizing ability;

a reducing agent supplying unit for supplying the reducing agent to exhaust gas at a location upstream of the $NO_x$ selective reduction catalyst;

an upstream detection unit for detecting the $NO_x$ concentration at a location downstream of the catalyst having an oxidizing ability and upstream of the $NO_x$ selective reduction catalyst; and a downstream detection unit for detecting the $NO_x$ concentration in exhaust gas at a location downstream of the $NO_x$ selective reduction catalyst; and comprises:

an estimation unit for estimating the ratio of $NO_2$ in the $NO_x$ which inflows into the $NO_x$ selective reduction catalyst under the assumption that the degree of deterioration of the catalyst having an oxidizing ability is at a predetermined value;

a calculation unit for calculating the $NO_x$ removal rate of the $NO_x$ selective reduction catalyst a plurality of times at least until a local maximum value is obtained, which calculation is carried out based on the $NO_x$ concentrations detected by the upstream detection unit and the downstream detection unit when the reducing agent was supplied by the reducing agent supplying unit; and a determination unit for determining the degree of deterioration of the catalyst having an oxidizing ability, which unit is carried out by comparison between: the ratio of $NO_2$ estimated by the estimation unit when the $NO_x$ removal rate of the $NO_x$ selective reduction catalyst reaches a local maximum value; and a reference value of the ratio.

The $NO_x$ selective reduction catalyst selectively reduces $NO_x$ using, for example, ammonia as a reducing agent. The reducing agent supplying unit may comprise an injection equipment for injection of, for example, an aqueous ammonia or urea solution. The upstream detection unit may, for example, estimate the $NO_x$ concentration based on the operating state of the internal combustion engine or measure the $NO_x$ concentration with a sensor. Since the $NO_x$ concentration in exhaust gas does not change when the exhaust gas passes through the catalyst having an oxidizing ability, the $NO_x$ concentration in the upstream of the catalyst having an oxidizing ability and the $NO_x$ concentration in its downstream can be regarded as being equal. The downstream detection unit measures the $NO_x$ concentration after removal of $NO_x$ by the $NO_x$ selective reduction catalyst, for example with a sensor. It should be noted that the $NO_x$ includes NO and $NO_2$. The reducing agent may be supplied based on this $NO_x$ concentration.

Here, depending on the degree of deterioration of the catalyst having an oxidizing ability, the ratio of $NO_2$ in the $NO_x$ which outflows from the catalyst varies. That is, NO is oxidized to $NO_2$ when it passes through the catalyst having an oxidizing ability, and the ratio at which NO is oxidized to $NO_2$ varies depending on the degree of deterioration of the catalyst having an oxidizing ability. Therefore, the ratio of $NO_2$ in the $NO_x$ which inflows into the $NO_x$ selective reduction catalyst varies depending on the degree of deterioration of the catalyst having an oxidizing ability. The estimation unit estimates the ratio of $NO_2$ in the $NO_x$ under the assumption that the degree of deterioration of the catalyst having an oxidizing ability is at a predetermined value. This predetermined value is an assumed value for obtaining the relationship between the $NO_x$ removal rate of the $NO_x$ selective reduction catalyst and the ratio of $NO_2$ in the $NO_x$ which inflows into the $NO_x$ selective reduction catalyst, and may be an arbitrary value.

The $NO_x$ concentration is then detected by the upstream detection unit, and the ratio of $NO_2$ in the $NO_x$ is temporarily determined by the estimation unit. That is, since the degree of deterioration of the catalyst having an oxidizing ability is not known, the ratio of $NO_2$ in the $NO_x$ which inflows into the $NO_x$ selective reduction catalyst is temporarily defined. Then, the relationship between the $NO_x$ removal rate of the $NO_x$ selective reduction catalyst and the ratio of $NO_2$ in the $NO_x$ which inflows into the $NO_x$ selective reduction catalyst is determined.

The $NO_x$ removal rate of the $NO_x$ selective reduction catalyst varies depending on the temperature of the $NO_x$ selective reduction catalyst and the ratio of $NO_2$ in the $NO_x$. Since, in cases where the temperature of the $NO_x$ selective reduction catalyst is within a predetermined range, almost equal amounts of NO and $NO_2$ are removed, the $NO_x$ removal rate becomes maximum when the ratio of $NO_2$ is at a specific value (about 50%, for example). It should be noted that the reference value according to the present invention is an actual ratio of $NO_2$ with which the NO removal rate of the $NO_x$ selective reduction catalyst reaches a local maximum value. This reference value is, for example, 50% or a value close thereto, and, since it may vary depending on the state and the type of the catalyst, it is optionally determined by an experiment or the like.

The actual ratio of $NO_2$ with which the $NO_x$ removal rate reaches a local maximum value does not change even when the degree of deterioration of the $NO_x$ selective reduction catalyst increased. That is, as deterioration of the $NO_x$ selective reduction catalyst proceeds, the $NO_x$ removal rate decreases, but the $NO_x$ removal rate becomes maximum when the ratio of $NO_2$ is at the reference value.

The calculation unit determines a local maximum value of the $NO_x$ removal rate by calculating the removal rate a plurality of times when the ratio of $NO_2$ varies. That is, since the $NO_x$ removal rate varies depending on the ratio of $NO_2$, a local maximum value is obtained by calculating the relationship between the $NO_x$ removal rate and the ratio of $NO_2$. This local maximum value is calculated under the assumption that the degree of deterioration of the catalyst having an oxidizing ability is at a predetermined value. Here, the $NO_x$ removal rate of the $NO_x$ selective reduction catalyst reaches a local maximum value when the ratio of $NO_2$ is at the reference value, but in cases where the assumed ratio of $NO_2$ is different from the actual value thereof, this does not occur. That is, the ratio at which the $NO_x$ removal rate reaches the local maximum value shifts from the reference value. This shift increases as the difference between the actual ratio of $NO_2$ and the ratio of $NO_2$ assumed by the estimation unit increases. That is, as the difference between the actual degree of deterioration of the catalyst having an oxidizing ability and the predetermined value increases, the shift, from the reference value, of the ratio of $NO_2$ at which the $NO_x$ removal rate reaches a local maximum value increases.

Thus, since there is a correlation between the shift, from the reference value, of the ratio of $NO_2$ at which the $NO_x$ removal rate reaches a local maximum value and the degree of deterioration of the catalyst having an oxidizing ability, the degree of deterioration of the catalyst having an oxidizing ability can be determined based on this shift. In this case, the higher the ratio of $NO_2$ at which the $NO_x$ removal rate reaches the local maximum value is than the reference value, the higher the degree of deterioration may be determined to be. Thus, by using a local maximum value of the $NO_x$ removal rate of the $NO_x$ selective reduction catalyst, the degree of deterioration of the catalyst having an oxidizing ability can be determined independently of the degree of deterioration of the $NO_x$ selective reduction catalyst. That is, without being influenced by the degree of deterioration of the $NO_x$ selective reduction catalyst, determination of the degree of deterioration of the catalyst having an oxidizing ability can be carried out.

The degree of deterioration of the catalyst having an oxidizing ability can be determined by comparison between the ratio of $NO_2$ at which the $NO_x$ removal rate of the $NO_x$ selective reduction catalyst reaches the local maximum value, which ratio is estimated by the estimation unit, and the reference value of the ratio, and in this case, the determination can be carried out based on either the difference between these or the ratio between these.

In the present invention, the determination of the degree of deterioration of the catalyst having an oxidizing ability is carried out using the ratio of $NO_2$ in the $NO_x$, but it is also possible to carry out the determination of the degree of deterioration using the ratio of NO in the $NO_x$ instead. That is, if we assume that the $NO_x$ consists essentially of NO and $NO_2$, as the ratio of $NO_2$ in the $NO_x$ increases, the ratio of NO decreases accordingly. By using this relationship, the determination of the degree of deterioration can be carried out using the ratio of NO in the $NO_x$.

In the present invention, a temperature detection unit for detecting the temperature of the $NO_x$ selective reduction catalyst is provided, wherein said calculation unit can calculate the $NO_x$ removal rate when the temperature detected by the temperature detection unit is within a predetermined range.

The temperature detection unit may either estimate the temperature based on the operating state of the internal combustion engine or measure the temperature with a sensor. The term "predetermined range" means a range within which equal amounts of NO and $NO_2$ react.

Here, the amount of NO or $NO_2$ reduced when NO or $NO_2$, respectively, is reduced by the $NO_x$ selective reduction catalyst varies depending on the temperature of the $NO_x$ selective reduction catalyst. The temperature range within which equal amounts of NO and $NO_2$ react is used as the predetermined range. Thus, by determining the relationship between the $NO_x$ removal rate and the ratio of $NO_2$ within the temperature range within which equal amounts of NO and $NO_2$ react, a local maximum value of the $NO_x$ removal rate can be obtained. When the temperature of the $NO_x$ selective reduction catalyst is within this predetermined range, the ratio of $NO_2$ at which the $NO_x$ removal rate reaches a local maximum value is constant independently of the degree of deterioration of the catalyst having an oxidizing ability. That is, by calculating the $NO_x$ removal rate when the temperature is within the predetermined range, a local maximum value of the $NO_x$ removal rate can be determined, so that the degree of deterioration of the oxidation catalyst can be determined easily.

In the present invention, a temperature detection unit for detecting the temperature of the $NO_x$ selective reduction catalyst;

a ratio calculation unit for calculating the ratio of $NO_2$ in the $NO_x$ which inflows into the $NO_x$ selective reduction catalyst, which calculation is carried out based on the degree of deterioration determined by the determination unit;

an activity determination unit for determining that the temperature of the $NO_x$ selective reduction catalyst reached the full activation temperature, which determination is carried out based on the temperature detected by the temperature detection unit; and an $NO_x$ catalyst deterioration determination unit for determining the degree of deterioration of the $NO_x$ selective reduction catalyst by comparison between: the full activation temperature observed when the ratio of $NO_2$ calculated by the ratio calculation unit is within a predetermined range; and a reference value of the full activation temperature;

can be included.

If the degree of deterioration of the catalyst having an oxidizing ability can be determined, the ratio at which NO is oxidized to $NO_2$ by the catalyst having an oxidizing ability can be determined, so that the ratio of $NO_2$ in the $NO_x$ which inflows into the $NO_x$ selective reduction catalyst can be accurately determined. That is, the ratio calculation unit can be accurately calculated the actual ratio of $NO_2$ in the $NO_x$ which inflows into the $NO_x$ selective reduction catalyst.

The $NO_x$ removal rate of the $NO_x$ selective reduction catalyst increases as the temperature increases until it reaches the full activation temperature, but after achieving the full activation temperature, the $NO_x$ removal rate hardly increases even if the temperature increased. That is, the full activation temperature can be defined as the temperature above which the $NO_x$ removal rate does not change even at a higher temperature. This may also be defined as the lower limit of the temperature at which increase in the $NO_x$ removal rate relative to increase in the temperature becomes not more than a predetermined value. Further, it can also be defined as the lower limit of a temperature at which the $NO_x$ removal rate is saturated. That is, the activity determination unit determines that the temperature of the $NO_x$ selective reduction catalyst reached the full activation temperature when, for example, the $NO_x$ removal rate hardly increases in spite of increase in the temperature of the $NO_x$ selective reduction catalyst.

As the degree of deterioration of the $NO_x$ selective reduction catalyst increases, the full activation temperature increases and the $NO_x$ removal rate upon achievement of the full activation temperature decreases. That is, the temperature at which the $NO_x$ removal rate becomes highest increases in parallel with the degree of deterioration. Thus, there is a correlation between the full activation temperature and the degree of deterioration, so that, by defining the reference value of the full activation temperature in advance, the degree of deterioration of the $NO_x$ selective reduction catalyst can be determined by comparison between the full activation temperature determined by the activity determination unit and the reference value. This reference value may be an arbitrary value, and may be, for example, the full activation temperature expected when the catalyst is new; the full activation temperature expected when the degree of deterioration is at a specific level; or the full activation temperature expected when the degree of deterioration is at the acceptable limit. The higher the full activation temperature is than the reference value, the higher the degree of deterioration may be determined to be.

The degree of deterioration of the $NO_x$ selective reduction catalyst is determined by comparison between the full activation temperature and the reference value of the full activation temperature, and in this case, it may be determined based on either the difference between these or the ratio between these.

The $NO_x$ removal rate relative to the temperature of the $NO_x$ selective reduction catalyst varies depending on the ratio of $NO_2$ in the $NO_x$ which inflows into the $NO_x$ selective reduction catalyst. Therefore, the $NO_x$ catalyst deterioration determination unit determines the degree of deterioration based on the full activation temperature observed when the ratio of $NO_2$ calculated by the ratio calculation unit is within a predetermined range. That is, by specifying the range of the ratio of $NO_2$, the degree of deterioration can be determined more accurately. The term "predetermined range" means the range of the ratio of $NO_2$ in which the full activation temperature can be determined based on the relationship between the temperature of the $NO_x$ selective reduction catalyst and the $NO_x$ removal rate. For example, the ratio of $NO_2$ may be 50% or a value close thereto.

In the present invention, the determination of the degree of deterioration of the $NO_x$ selective reduction catalyst is carried out using the ratio of $NO_2$ in the $NO_x$, but it is also possible to carry out the determination of the degree of deterioration using the ratio of NO in the $NO_x$ instead.

In the present invention, the estimation unit estimates the ratio of $NO_2$ using a predetermined value of the degree of deterioration of the catalyst having an oxidizing ability as the acceptable limit; and the determination unit determines the degree of deterioration of the catalyst having an oxidizing ability as exceeding the acceptable limit in cases where the ratio of $NO_2$ estimated by the estimation unit when the $NO_x$ removal rate of the $NO_x$ selective reduction catalyst reaches a local maximum value is higher than a reference value.

Therefore, by determining whether or not the ratio of $NO_2$ estimated by the estimation unit when the $NO_x$ removal rate of the $NO_x$ selective reduction catalyst reaches a local maximum value is higher than a reference value, whether or not the degree of deterioration of the catalyst having an oxidizing ability exceeds the acceptable limit can be determined. As the ratio of $NO_2$ at which the $NO_x$ removal rate reaches the local maximum value, which ratio is estimated by the estimation unit, increases compared to the reference value, the degree of deterioration of the catalyst having an oxidizing ability can be determined to be higher.

In cases where the ratio of $NO_2$ estimated by the estimation unit when the $NO_x$ removal rate is at a local maximum value is lower than the reference value, the degree of deterioration of the catalyst having an oxidizing ability can be determined to be acceptable. As the ratio of $NO_2$ decreases relative to the reference value, the degree of deterioration of the catalyst having an oxidizing ability can be determined to be lower.

In the present invention, in the $NO_x$ catalyst deterioration determination unit, the reference value of the full activation temperature is set to the full activation temperature expected when the degree of deterioration of the $NO_x$ selective reduction catalyst is at the acceptable limit; and the degree of deterioration of the $NO_x$ selective reduction catalyst can determined as exceeding the acceptable limit in cases where the full activation temperature is higher than the reference value.

Therefore, by determining whether or not the full activation temperature is higher than the reference value, whether or not the degree of deterioration of the $NO_x$ selective reduction catalyst exceeds the acceptable limit can be determined. As the full activation temperature increases compared to the reference value, the degree of deterioration of the $NO_x$ selective reduction catalyst can be determined to be higher.

In cases where the full activation temperature is lower than the reference value, the degree of deterioration of the $NO_x$ selective reduction catalyst can be determined to be acceptable. As the full activation temperature decreases relative to the reference value, the degree of deterioration of the $NO_x$ selective reduction catalyst can be determined to be lower.

To achieve the above-described purposes, the method of the present invention for determining deterioration of a catalyst employed the means below. That is, the method of the present invention for determining deterioration of an $NO_x$ catalyst comprises:

a first step wherein, under the assumption that the degree of deterioration of a catalyst which is disposed at a location upstream of an $NO_x$ selective reduction catalyst and has an oxidizing ability is at a predetermined value, the ratio of $NO_2$ in the $NO_x$ which inflows into the $NO_x$ selective reduction catalyst is estimated;

a second step wherein the $NO_x$ removal rate of the $NO_x$ selective reduction catalyst is calculated a plurality of times at least until a local maximum value is obtained; and a third step wherein the degree of deterioration of the catalyst having an oxidizing ability is determined by comparison between: the ratio of $NO_2$ obtained in the first step when the $NO_x$ removal rate of the $NO_x$ selective reduction catalyst reaches a local maximum value; and a reference value of the ratio.

In this case:

a fourth step wherein the ratio of $NO_2$ in the $NO_x$ which inflows into the $NO_x$ selective reduction catalyst is calculated based on the degree of deterioration of the catalyst having an oxidizing ability, which degree of deterioration is determined in the third step;

a fifth step wherein, based on the ratio of $NO_2$ calculated in the fourth step, the removal rate by the $NO_x$ selective reduction catalyst is detected a plurality of times at least until the full activation temperature is obtained; and a sixth step wherein the degree of deterioration of the $NO_x$ selective reduction catalyst is determined by comparison between: the full activation temperature obtained in the fifth step when the ratio of $NO_2$ calculated in the fourth step is within a predetermined range; and a reference value of the full activation temperature can also be included in the method.

Effect of the Invention

According to the present invention, the degree of deterioration can be accurately determined in cases where a plurality of catalysts is disposed at an exhaust passage of an internal combustion engine.

DESCRIPTION OF SYMBOLS

Figure 1:
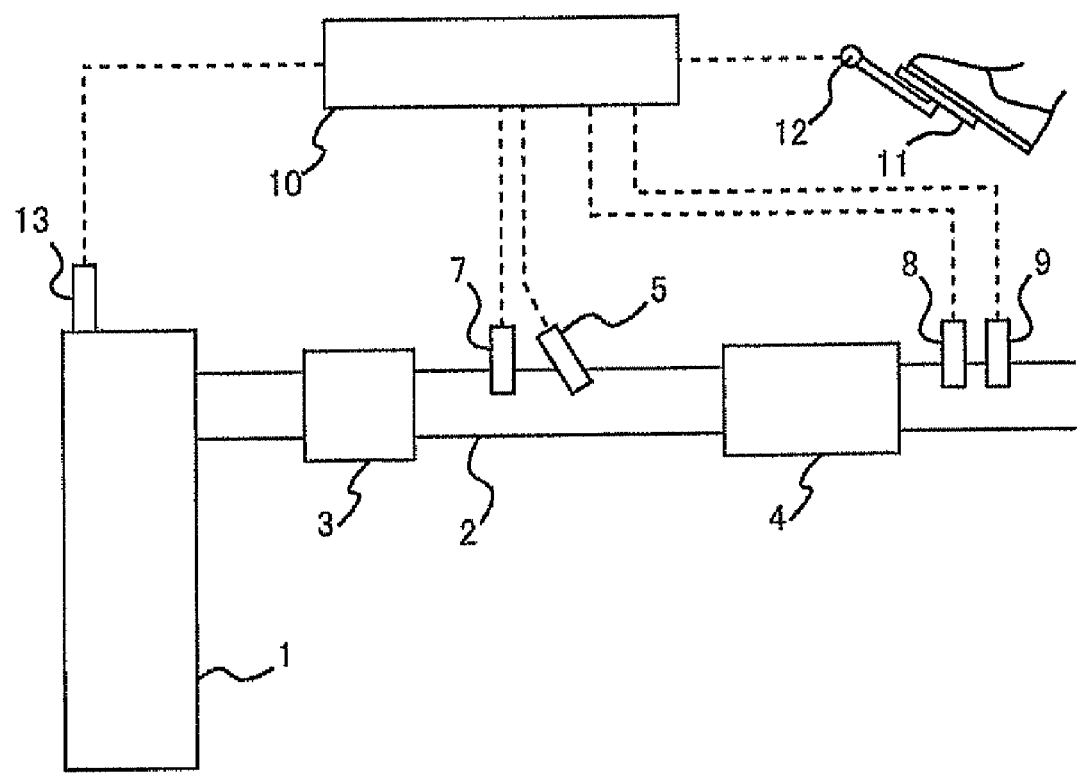
FIG. 1 is a schematic view showing the internal combustion engine of the present embodiment and its exhaust system.

1 Internal combustion engine
2 Exhaust passage
3 Oxidation catalyst
4 $NO_x$ selective reduction catalyst
5 Injection valve
7 First $NO_x$ sensor
8 Second $NO_x$ sensor
9 Temperature sensor
10 ECU
11 Accelerator pedal
12 Accelerator position sensor
13 Crank position sensor

BEST MODE FOR CARRYING OUT THE INVENTION

Specific modes of the device for determining deterioration of a catalyst and the method for determining deterioration of a catalyst according to the present invention will now be described by way of the figures.

First Embodiment

FIG. 1 is a schematic view showing the internal combustion engine of the present embodiment and its exhaust system. The internal combustion engine 1 shown in FIG. 1 is a water-cooled four-stroke diesel engine having four cylinders. In the present embodiment, a urea SCR system is employed.

To the internal combustion engine 1, an exhaust passage 2 is connected. Along this exhaust passage 2, an oxidation catalyst 3 and an $NO_x$ selective reduction catalyst 4 (hereinafter referred to as "$NO_x$ catalyst 4") are disposed in the order mentioned from the upstream. The oxidation catalyst 3 may be another catalyst having an oxidizing ability (three-way catalyst, for example), instead. In the present embodiment, the oxidation catalyst 3 corresponds to the catalyst of the present invention having an oxidizing ability.

At a location along the exhaust passage 2 which is downstream of the oxidation catalyst 3 and upstream of the $NO_x$ catalyst 4, an injection valve 5 for injection of an aqueous urea solution to exhaust gas is disposed. The injection valve 5 opens by a signal from later-mentioned ECU 10 to inject the aqueous urea solution to the exhaust gas. In the present embodiment, the injection valve 5 corresponds to the reducing agent supplying unit of the present invention.

The aqueous urea solution injected from the injection valve 5 is hydrolyzed by the heat of the exhaust gas to produce ammonia ($NH_3$), which adsorbs to the $NO_x$ catalyst 4. This $NH_3$ causes reduction of the $NO_x$.

At a location along the exhaust passage 2 which is downstream of the oxidation catalyst 3 and upstream of the injection valve 5, a first $NO_x$ sensor 7 which measures the $NO_x$ concentration in the exhaust gas is disposed. Further, at a location along the exhaust passage 2 which is downstream of the $NO_x$ catalyst 4, a second $NO_x$ sensor 8 for measuring the $NO_x$ concentration in the exhaust gas and a temperature sensor 9 for measuring the temperature of the exhaust gas are disposed. In the present embodiment, the first $NO_x$ sensor 7 corresponds to the upstream detection unit of the present invention. Further, in the present embodiment, the second $NO_x$ sensor 8 corresponds to the downstream detection unit of the present invention. Further, in the present embodiment, the temperature sensor 9 corresponds to the temperature detection unit of the present invention. Instead of measuring the $NO_x$ concentration with the first $NO_x$ sensor 7, the $NO_x$ concentration may also be estimated based on the operating state of the internal combustion engine 1.

In the internal combustion engine 1, ECU 10 which is an electronic control unit for controlling the internal combustion engine 1 is also provided. This ECU 10 is a unit for controlling the operating state of the internal combustion engine 1 according to the operating condition of the internal combustion engine 1 and to a demand of its operator.

To the ECU 10, in addition to the above-described sensor, an accelerator position sensor 12, which outputs an electric signal according to the degree of an operator's depression of the accelerator pedal 11 and detects the engine load, and a crank position sensor 13 which detects the engine speed are connected through electric wiring to allow output signals of these sensors to be input to the ECU 10.

On the other hand, to the ECU 10, the injection valve 5 is connected through electric wiring, and timings of opening and closing of the injection valve 5 are controlled by the ECU 10.

Here, the $NO_x$ removal rate of the $NO_x$ catalyst 4 varies depending on the ratio of $NO_2$ in the $NO_x$ and the temperature of the $NO_x$ catalyst 4. In the $NO_x$ catalyst 4, the following reactions are considered to occur depending on the temperature.

$$6NO_2 + 8NH_3 \rightarrow 7N_2 + 12H_2O \qquad \text{Formula (1)}$$

$$4NO + 4NH_3 + O_2 \rightarrow 4N_2 + 6H_2O \qquad \text{Formula (2)}$$

$$NO + NO_2 + 2NH_3 \rightarrow 2N_2 + 3H_2O \qquad \text{Formula (3)}$$

Here, the reaction rate of Formula (1) is slow, so that it is a reaction for removal of $NO_2$ which mainly occurs at a high temperature. The reaction rate of Formula (2) is slower than Formula (1), so that it is a reaction for removal of NO which occurs even at a temperature lower than that at which Formula (1) occurs. The reaction rate of Formula (3) is faster, so that it is a reaction for removal of NO and $NO_2$ which occurs even at a temperature lower than that at which Formula (2) occurs. By the reaction indicated by Formula (3), equal amounts of NO and $NO_2$ are removed. That is, within the range of the temperature in which the reaction indicated by Formula (3) occurs, the $NO_x$ removal rate becomes maximum when the ratio between NO and $NO_2$ is 1:1. Therefore, in the oxidation catalyst 3, NO is oxidized such that the ratio between NO and $NO_2$ becomes 1:1, that is, the ratio of $NO_2$ in the $NO_x$ becomes 50%. The oxidizing ability of the oxidation catalyst 3 is determined such that such a ratio is attained.

That is, the ratio of $NO_2$ in the $NO_x$ changes when the exhaust gas passes through the oxidation catalyst 3. The amount of the change in the ratio of $NO_2$ in the $NO_x$ depends on the amount of $NO_2$ produced in the oxidation catalyst 3. As deterioration of the oxidation catalyst 3 proceeds, production of $NO_2$ becomes more difficult. Further, as the temperature of the oxidation catalyst 3 increases, $NO_2$ is produced more easily since the oxidation reaction is promoted. Further, as the flow speed of the exhaust gas becomes higher, production of $NO_2$ becomes more difficult since the $NO_x$ which passes through the oxidation catalyst 3 without reacting with the oxidation catalyst 3 increases. It should be noted that, although $NO_x$ is oxidized to $NO_2$ when the exhaust gas passes through the oxidation catalyst 3, the $NO_x$ concentration does not change in this case.

Thus, the ratio of $NO_2$ in the $NO_x$ which outflows from the oxidation catalyst 3 (that is, the ratio of $NO_2$ in the $NO_x$ which inflows into the $NO_x$ catalyst 4) can be estimated based on the ratio of $NO_2$ in the $NO_x$ which outflows from the internal combustion engine 1, the temperature of the oxidation catalyst 3, the amount of the inhaled air (this may also be the amount of the exhaust gas), and the degree of deterioration of the oxidation catalyst 3. The temperature of the oxidation catalyst 3 may be either measured by a sensor or estimated based on the operating state of the internal combustion engine 1. The amount of the inhaled air can be measured by installation of an air flow meter. In terms of the degree of deterioration of the oxidation catalyst 3, details will be described later.

The ratio of $NO_2$ in the NOx exhausted from the internal combustion engine 1 can be estimated based on the engine speed, the quantity of fuel (this may also be the engine load), the combustion temperature and the like. Since well-known technologies can be used for this estimation, its details will not be described. Further, these relationships may be determined in advance by an experiment or the like and mapped to be stored in ECU 10.

Thus, depending on the degree of deterioration of the oxidation catalyst 3, the ratio of $NO_2$ in the $NO_x$ varies, so that the $NO_x$ removal rate of the $NO_x$ catalyst 4 also varies. That is, even if only the $NO_x$ removal rate is detected, it is still necessary to identify the cause of the decrease in the $NO_x$ removal rate between deterioration of the oxidation catalyst 3 and deterioration of the $NO_x$ catalyst 4. Therefore, in the present embodiment, the degree of deterioration of the oxidation catalyst 3 is first determined.

Figure 2:
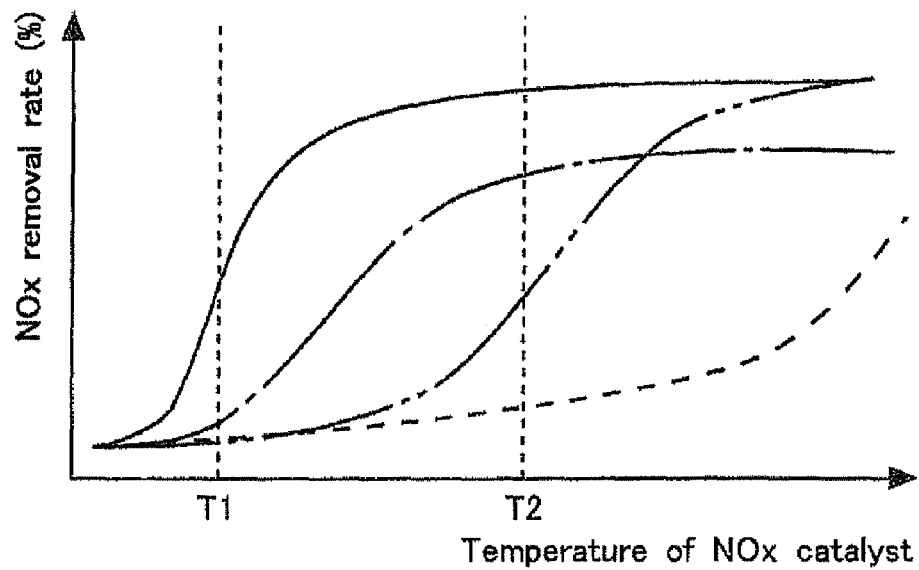
FIG. 2 is a diagram showing the relationship between the temperature (bed temperature) of the $NO_x$ catalyst and the $NO_x$ removal rate of the $NO_x$ catalyst.

FIG. 2 is a diagram showing the relationship between the temperature (bed temperature) of the $NO_x$ catalyst and the $NO_x$ removal rate of the $NO_x$ catalyst 4. The solid line indicates the removal rate by only the reaction of Formula (3) and in cases where the $NO_x$ catalyst 4 is normal. The alternate long and short dash line indicates the removal rate by only the reaction of Formula (3) and in cases where the $NO_x$ catalyst 4 is deteriorated. The alternate long and two short dashes line indicates the removal rate by only the reaction of Formula (2) and in cases where the $NO_x$ catalyst 4 is normal. The broken line indicates the removal rate by only the reaction of Formula (1) and in cases where the $NO_x$ catalyst 4 is normal. Here, the term "normal" means that the degree of deterioration does not exceed the acceptable limit. The term "deteriorated" means that the degree of deterioration exceeds the acceptable limit.

As shown in FIG. 2, there is a temperature range in which the reaction of Formula (3) is dominant. That is, within the range of the temperature of the $NO_x$ catalyst 4 between T1 and T2 shown in FIG. 2, removal of the $NO_x$ by the reactions of Formula (1) and Formula (2) hardly occurs, and the $NO_x$ is removed mainly by the reaction of Formula (3).

Here, by the reaction by Formula (3), equal amounts of NO and $NO_2$ are removed. Therefore, when the ratio of $NO_2$ is 50%, the removal rate by the $NO_x$ catalyst 4 becomes maximum.

Figure 3:
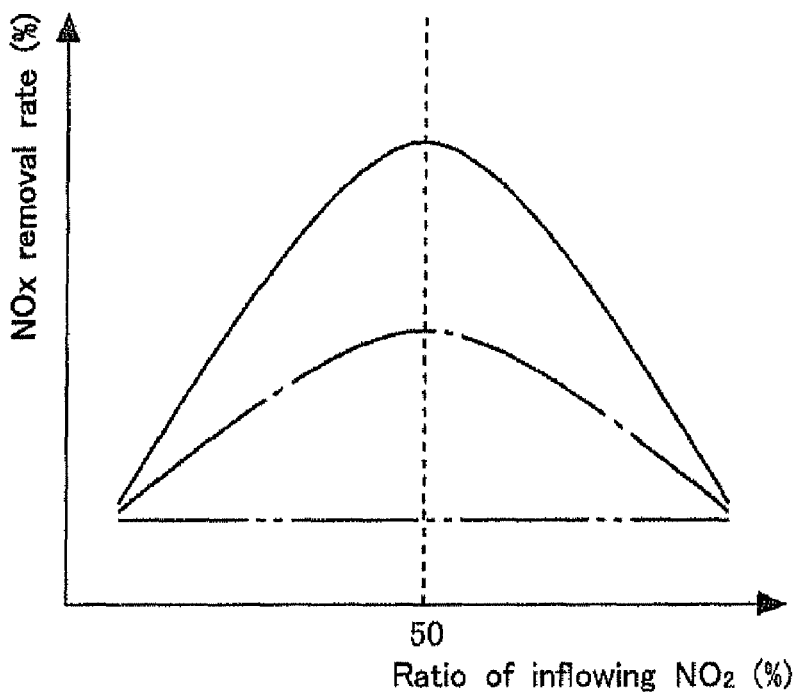
FIG. 3 is a diagram showing, for each temperature of the $NO_x$ catalyst, the relationship between the ratio of $NO_2$ in the $NO_x$ which inflows into the $NO_x$ catalyst when the $NO_x$ catalyst is normal and the $NO_x$ removal rate of the $NO_x$ catalyst.

FIG. 3 is a diagram showing, for each temperature of the $NO_x$ catalyst 4, the relationship between the ratio of $NO_2$ in the $NO_x$ which inflows into the $NO_x$ catalyst 4 when the $NO_x$ catalyst 4 is normal and the $NO_x$ removal rate of the $NO_x$ catalyst 4. This relationship is expected within the range between T1 and T2 shown in FIG. 2. The solid line indicates the case of, for example, 220° C.; the alternate long and short dash line indicates the case of, for example, 200° C.; and the alternate long and two short dashes line indicates the case of for example, 180° C.

Thus, as the temperature of the $NO_x$ catalyst 4 increases, the $NO_x$ removal rate of the $NO_x$ catalyst 4 increases. At any temperature, the $NO_x$ removal rate becomes maximum when the ratio of $NO_2$ is 50%. The removal rate becomes maximum when the temperature of the $NO_x$ catalyst 4 is, for example, 220° C., and the removal rate hardly changes even at a higher temperature. That is, in cases where the $NO_x$ catalyst 4 is normal, the full activation temperature is, for example, 220° C.

Figure 4:
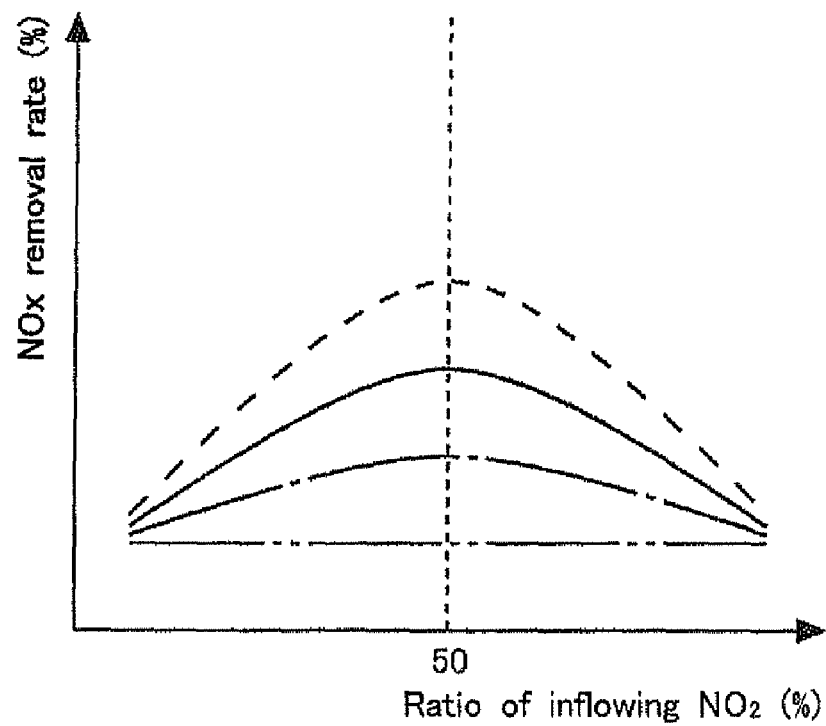
FIG. 4 is a diagram showing, for each temperature of the $NO_x$ catalyst, the relationship between the ratio of $NO_2$ in the $NO_x$ which inflows into the $NO_x$ catalyst when the $NO_x$ catalyst is deteriorated and the $NO_x$ removal rate of the $NO_x$ catalyst.

On the other hand, FIG. 4 is a diagram showing, for each temperature of the $NO_x$ catalyst 4, the relationship between the ratio of $NO_2$ in the $NO_x$ which inflows into the $NO_x$ catalyst 4 when the $NO_x$ catalyst 4 is deteriorated and the $NO_x$ removal rate of the $NO_x$ catalyst 4. This relationship is expected, similarly to FIG. 3, within the range between T1 and T2 shown in FIG. 2. In addition to the lines in FIG. 3, a broken line indicating the case of, for example, 240° C. is included herein.

Also in this case, as the temperature of the $NO_x$ catalyst 4 increases, the $NO_x$ removal rate of the $NO_x$ catalyst 4 increases. At any temperature, the $NO_x$ removal rate becomes maximum when the ratio of $NO_2$ is 50%. The removal rate becomes maximum when the temperature of the $NO_x$ catalyst 4 is, for example, 240° C., and the removal rate hardly changes even at a higher temperature. That is, in cases where the $NO_x$ catalyst 4 is deteriorated, the full activation temperature is, for example, 240° C.

That is, within the range of the temperature of the $NO_x$ catalyst 4 between T1 and T2 shown in FIG. 2, the $NO_x$ removal rate becomes maximum when the ratio of $NO_2$ in the $NO_x$ which inflows into the $NO_x$ catalyst 4 is 50%, independently of the degree of deterioration of the $NO_x$ catalyst 4. In the present embodiment, the degree of deterioration of the oxidation catalyst 3 is determined using this relationship.

First, the ratio of $NO_2$ in the $NO_x$ which inflows into the $NO_x$ catalyst 4 is estimated under the assumption that the degree of deterioration of the oxidation catalyst 3 is at a predetermined value. Here, the ratio of $NO_2$ in the $NO_x$ which inflows into the $NO_x$ catalyst 4 varies depending on how much NO is oxidized to $NO_2$ in the oxidation catalyst 3. And, the amount of NO which is oxidized to $NO_2$ varies depending on the degree of deterioration of the oxidation catalyst 3. However, at this stage, the degree of deterioration of the oxidation catalyst 3 is unknown.

Thus, the present embodiment assumes that the degree of deterioration of the oxidation catalyst 3 is at a predetermined value, to estimate the ratio of $NO_2$ in the $NO_x$ which outflows from the oxidation catalyst 3. Here, the ratio of $NO_2$ in the $NO_x$ which outflows from the oxidation catalyst 3 and the ratio of $NO_2$ in the $NO_x$ which inflows into the $NO_x$ catalyst 4 are regarded as being the same. In the present embodiment, the ratio of $NO_2$ is estimated based on the temperature of the oxidation catalyst 3 and the amount of the air inhaled into the internal combustion engine 1.

That is, since the amount of NO which is oxidized to $NO_2$ by the oxidation catalyst 3 varies depending on the temperature of, and the amount of the air inhaled into (which may instead be the amount of the exhaust gas from), the oxidation catalyst 3, the ratio of $NO_2$ in the $NO_x$ can be determined based on these values. Other parameters may be also used for estimation of the ratio of $NO_2$.

Figure 5:
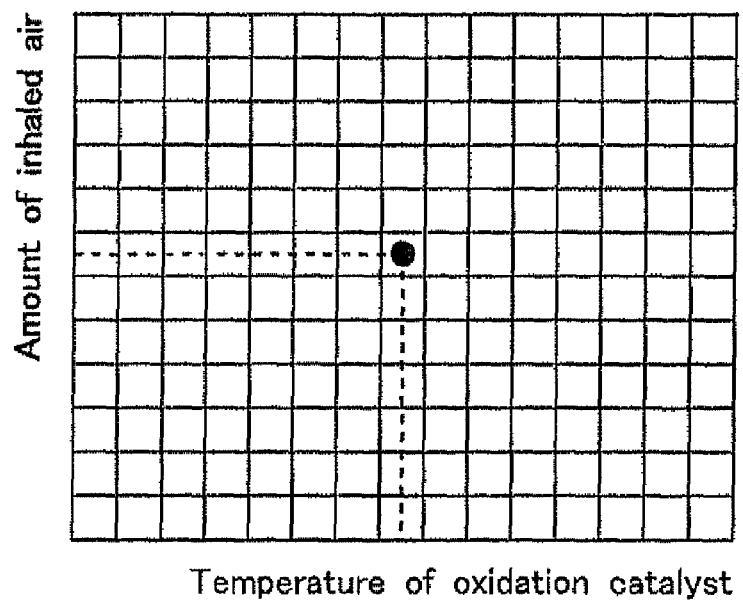
FIG. 5 is a map to obtain the ratio of $NO_2$ using as parameters the temperature of the oxidation catalyst and the amount of the air inhaled into the internal combustion engine.

Further, also depending on the ratio of $NO_2$ in the $NO_x$ which inflows into the oxidation catalyst 3 (that is, the ratio of $NO_2$ in the $NO_x$ which outflows from the internal combustion engine 1), the ratio of $NO_2$ in the $NO_x$ which outflows from the oxidation catalyst 3 varies. Thus, the ratio of $NO_2$ in the NOx exhausted from the internal combustion engine 1 may be first determined, which ratio may be then changed based on the temperature of and the amount of the air inhaled into, the oxidation catalyst 3. Since the ratio of $NO_2$ in the NOx exhausted from the internal combustion engine 1 varies depending on the operating state of the internal combustion engine 1, the relationship between these is determined by an experiment or the like and mapped in advance FIG. 5 is a map to obtain the ratio of $NO_2$ using as parameters the temperature of the oxidation catalyst 3 and the amount of the air inhaled into the internal combustion engine 1. This may be used as a map for multiplying the ratio of $NO_2$ in the $NO_x$ exhausted from the internal combustion engine 1 for correction of the ratio. Further, the map may be prepared to include the ratio of $NO_2$ in the $NO_x$ exhausted from the internal combustion engine 1. That is, since examples of the factors which affect the ratio of $NO_2$ in the $NO_x$ which inflows into the $NO_x$ catalyst 4 include the temperature of the oxidation catalyst 3 and the amount of the air inhaled into the internal combustion engine 1, the ratio of $NO_2$ is estimated based on these values. These relationships are determined in advance by an experiment or the like.

Subsequently, the relationship between: the ratio of $NO_2$ in the $NO_x$ which inflows into the $NO_x$ catalyst 4, which ratio is expected when the temperature of the $NO_x$ catalyst 4 is within the temperature range in which the reaction of Formula (3) is dominant; and the $NO_x$ removal rate of the $NO_x$ catalyst 4; is determined. The term "the ratio of $NO_2$ in the $NO_x$ which inflows into the $NO_x$ catalyst 4" herein means the ratio of $NO_2$ obtained based on FIG. 5.

To determine this relationship, a map is prepared taking the ratio of $NO_2$ in the $NO_x$ which inflows into the $NO_x$ catalyst 4 along the abscissa and taking the $NO_x$ removal rate of the $NO_x$ catalyst 4 along the ordinate. Since the removal rate varies depending on the temperature of the $NO_x$ catalyst 4, the map is prepared for each temperature of the $NO_x$ catalyst 4. In this case, the maps may be prepared for temperatures, for example, at intervals of 10° C. within the temperature range in which the reaction of Formula (3) is dominant.

Figure 6:
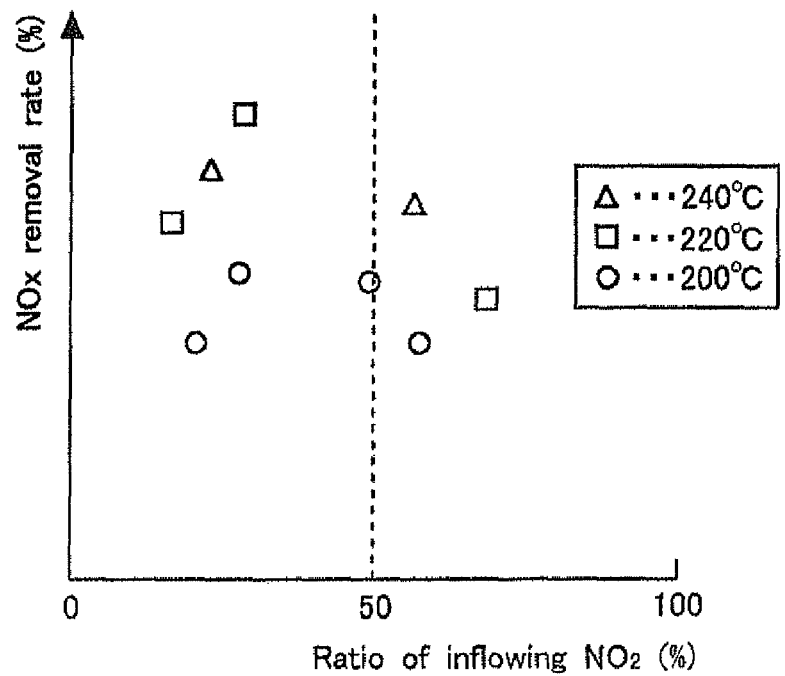
FIG. 6 is a map showing an example of the relationship between the ratio of $NO_2$ in the $NO_x$ which inflows into the $NO_x$ catalyst and the $NO_x$ removal rate of the $NO_x$ catalyst.

FIG. 6 is a map showing an example of the relationship between the ratio of $NO_2$ in the $NO_x$ which inflows into the $NO_x$ catalyst 4 and the $NO_x$ removal rate of the $NO_x$ catalyst 4. The relationship between the ratio of $NO_2$ and the $NO_x$ removal rate was determined a plurality of times, and each point was plotted in FIG. 6. Due to changes in the operating state of the internal combustion engine 1 and the temperature of the oxidation catalyst 3, a plurality of points is plotted on the map in FIG. 6. Preparation of this map is continued until a local maximum value of the $NO_x$ removal rate can be identified.

Figure 7:
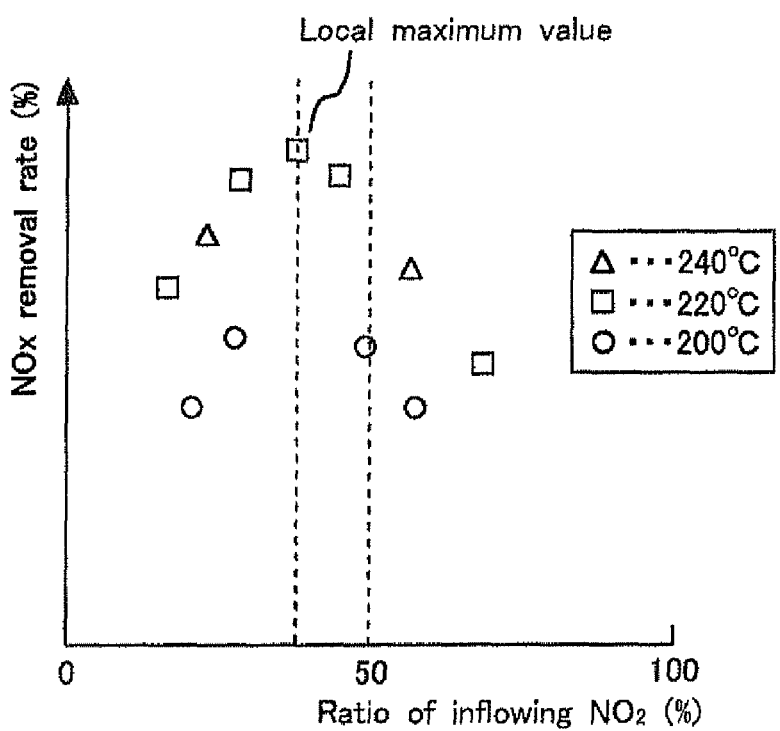
FIG. 7 is a map in which points are plotted to an extent enough to allow determination of a local maximum value of the $NO_x$ removal rate.

FIG. 7 is a map based on the map of FIG. 6, wherein points were plotted to an extent enough to allow determination of a local maximum value of the $NO_x$ removal rate. As one can see in FIG. 7, there exists a local maximum value of the $NO_x$ removal rate. As mentioned above, deterioration of the oxidation catalyst 3 does not cause changes in the actual ratio of $NO_2$ with which the $NO_x$ removal rate of the $NO_x$ catalyst 4 becomes maximum. That is, in cases where the ratio of $NO_2$ with which the $NO_x$ removal rate is at a local maximum value, shown in FIG. 7, is shifted from 50%, the actual degree of deterioration of the oxidation catalyst 3 can be said to be shifted from the predetermined value of the degree of deterioration used in FIG. 5. As this shift increases, the difference between the actual degree of deterioration and the predetermined value increases. Further, in cases where the ratio of $NO_2$ with which a local maximum value is attained, shown in FIG. 7, is lower than 50%, the degree of deterioration of the oxidation catalyst 3 can be said to be lower than the predetermined value. On the other hand, in cases where the ratio of $NO_2$ with which a local maximum value is attained, shown in FIG. 7, is higher than 50%, the degree of deterioration of the oxidation catalyst 3 can be said to be higher than the predetermined value.

In cases where the predetermined value of the degree of deterioration is set to the acceptable limit, the oxidation catalyst 3 can be determined to be normal when the ratio of $NO_2$ at which a local maximum value is attained is lower than 50%. Further, when the ratio of $NO_2$ at which a local maximum value is attained is higher than 50%, the oxidation catalyst 3 can be determined to be deteriorated.

Figure 8:
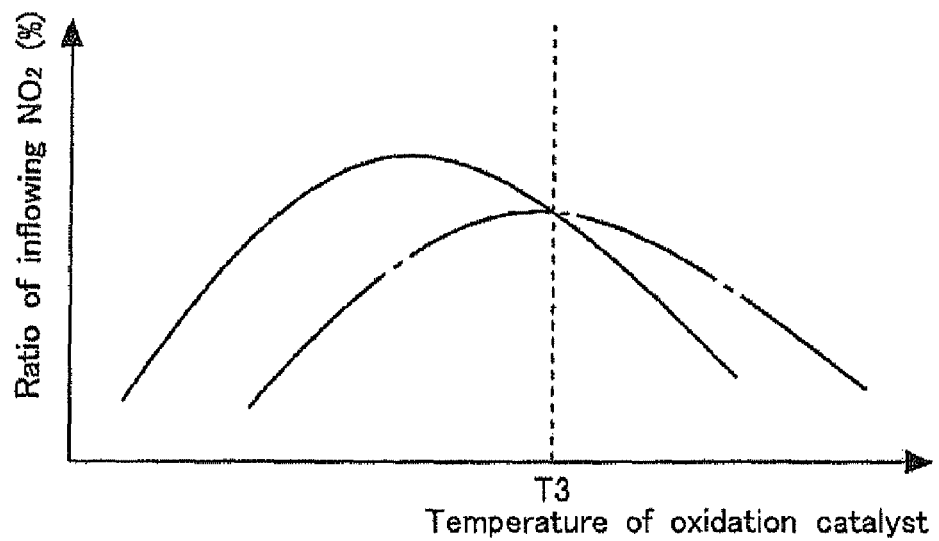
FIG. 8 is a diagram showing the relationship between the temperature (bed temperature) of the oxidation catalyst and the ratio of $NO_2$ in the $NO_x$ which inflows into the $NO_x$ catalyst.
Figure 9:
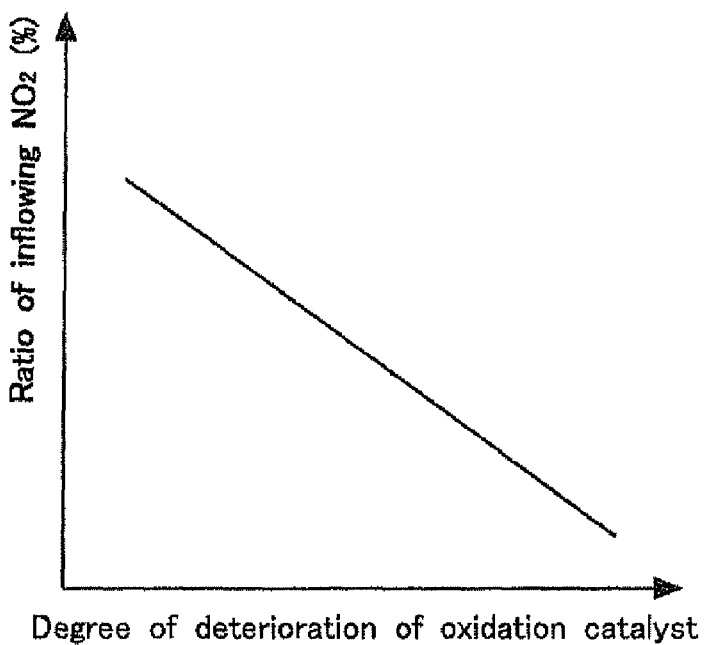
FIG. 9 is a diagram showing the relationship between the degree of deterioration of the oxidation catalyst and the ratio of $NO_2$ in the $NO_x$ which inflows into the $NO_x$ catalyst.

The determination of deterioration of the oxidation catalyst 3 is carried out when the temperature of the oxidation catalyst 3 is within the range described below. FIG. 8 is a diagram showing the relationship between the temperature (bed temperature) of the oxidation catalyst 3 and the ratio of $NO_2$ in the $NO_x$ which inflows into the $NO_x$ catalyst 4. The solid line indicates the case of a new catalyst and the alternate long and short dash line indicates the case of a deteriorated catalyst. In FIG. 8, there exist: a temperature range in which the ratio of $NO_2$ is higher with the new oxidation catalyst 3 than with the deteriorated oxidation catalyst 3; and a temperature range in which the ratio of $NO_2$ is lower with the new oxidation catalyst 3 than with the deteriorated oxidation catalyst 3. And, the temperature T3 of the oxidation catalyst 3 is the boundary between these. Within the temperature range in which the ratio of $NO_2$ is higher with the new oxidation catalyst 3 than with the deteriorated oxidation catalyst 3, as the degree of deterioration increases, the ratio of $NO_2$ in the $NO_x$ which inflows into the $NO_x$ catalyst 4 decreases. That is, within the range lower than the temperature indicated as T3 in FIG. 8, as the degree of deterioration of the oxidation catalyst 3 increases, the ratio of $NO_2$ in the $NO_x$ which inflows into the $NO_x$ catalyst 4 decreases as shown in FIG. 9. Here, FIG. 9 is a diagram showing the relationship between the degree of deterioration of the oxidation catalyst 3 and the ratio of $NO_2$ in the $NO_x$ which inflows into the $NO_x$ catalyst 4. In the present embodiment, the determination of deterioration of the oxidation catalyst 3 is carried out when the temperature of the oxidation catalyst 3 is lower than the temperature indicated as T3 in FIG. 8. By this, the relationship between the degree of deterioration of the oxidation catalyst 3 and the ratio of $NO_2$ in the $NO_x$ which inflows into the $NO_x$ catalyst 4 can be easily obtained.

As explained above, by the present embodiment, the degree of deterioration of the oxidation catalyst 3 can be determined. Thus, since the degree of deterioration of the oxidation catalyst 3 can be determined, the ratio of $NO_2$ in the $NO_x$ which inflows into the $NO_x$ catalyst 4 can be accurately determined. Here, in cases where the determination of deterioration of the $NO_x$ catalyst 4 is carried out based on the $NO_x$ removal rate, it is necessary to accurately determine the ratio of $NO_2$ in the $NO_x$ which inflows into the $NO_x$ catalyst 4. Since, in the present embodiment, the ratio of $NO_2$ in the $NO_x$ which inflows into the $NO_x$ catalyst 4 can be accurately determined, the determination of deterioration of the $NO_x$ catalyst 4 can be carried out more accurately. The determination of deterioration of the $NO_x$ catalyst 4 will now be described below.

Figure 10:
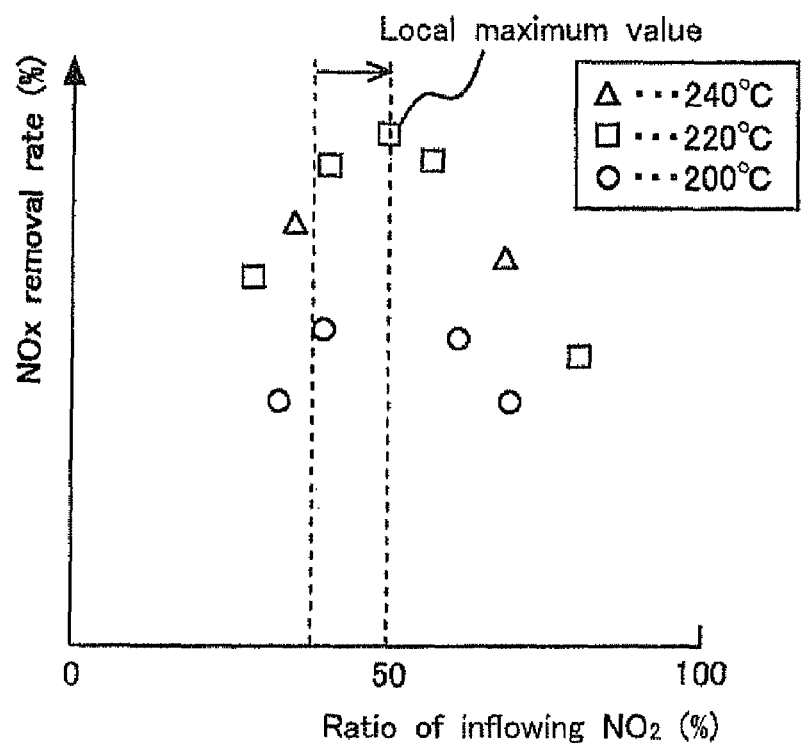
FIG. 10 is a map obtained after correction of the relationship shown in FIG. 7 based on the degree of deterioration of the oxidation catalyst.

Here, FIG. 10 is a map obtained after correction of the relationship shown in FIG. 7 based on the degree of deterioration of the oxidation catalyst 3. For example, the map of FIG. 5 is corrected based on the degree of deterioration of the oxidation catalyst 3 to recalculate the relationship between the ratio of $NO_2$ and the $NO_x$ removal rate. The relationship between the shift, from 50%, of the ratio of $NO_2$ shown in FIG. 7 at which the local maximum value is attained and the correction value is determined in advance by an experiment or the like. Further, in FIG. 7, the correction value may be defined as the value obtained by dividing 50% by the ratio of $NO_2$ at which the local maximum value is attained, and each ratio of $NO_2$ may be multiplied by this correction value. Further, the correction value may be defined as the difference between 50% and the ratio of $NO_2$ at which the local maximum value is attained, which correction value is then added to each ratio of $NO_2$.

Thus, by determining the ratio of $NO_2$ in the $NO_x$, the $NO_x$ removal rate of the $NO_x$ catalyst 4 can be determined. The degree of deterioration of the NO catalyst 4 is then determined from the relationship between the temperature of the $NO_x$ catalyst 4 and the removal rate of the $NO_x$ catalyst 4.

Figure 11:
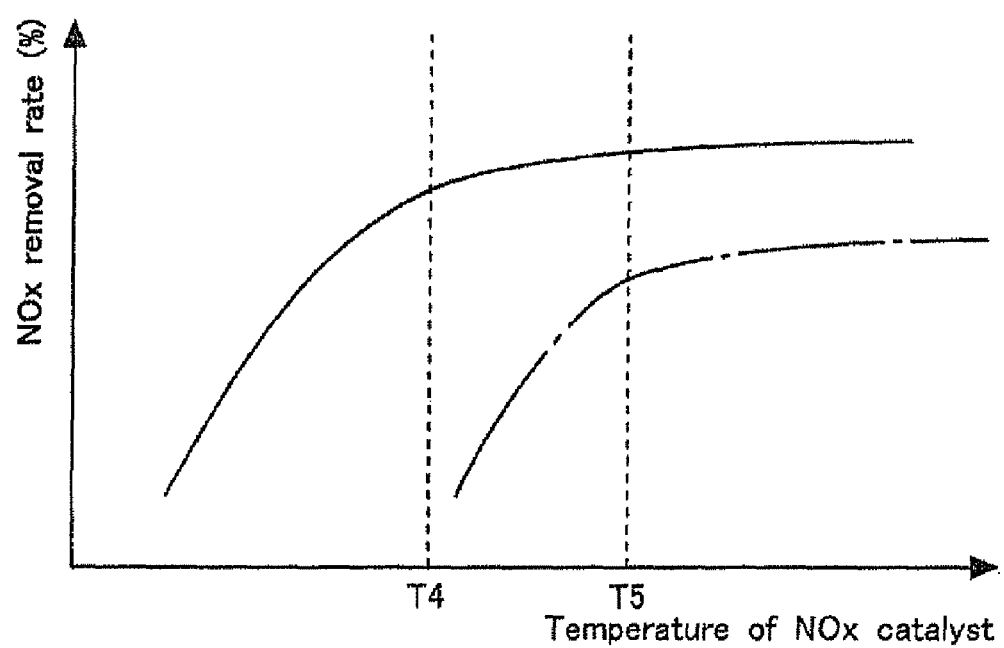
FIG. 11 is a diagram showing the relationship between the temperature (bed temperature) of the $NO_x$ catalyst and the $NO_x$ removal rate of the $NO_x$ catalyst.

FIG. 11 is a diagram showing the relationship between the temperature (bed temperature) of the $NO_x$ catalyst 4 and the $NO_x$ removal rate of the $NO_x$ catalyst 4. The solid line indicates the case of a new catalyst and the alternate long and short dash line indicates the case of a deteriorated catalyst. The temperature T4 indicates the lower limit of a temperature at which the $NO_x$ removal rate of the $NO_x$ catalyst 4 hardly increases even when the temperature of the $NO_x$ catalyst 4 increases. That is, it indicates the full activation temperature of a new catalyst. The temperature T5 is the full activation temperature of a deteriorated $NO_x$ catalyst 4.

Before the temperature of the $NO_x$ catalyst 4 reaches the full activation temperature, the $NO_x$ removal rate increases as the temperature increases. After reaching the full activation temperature, the $NO_x$ removal rate hardly increases even at a higher temperature. Further, as the degree of deterioration of the $NO_x$ catalyst 4 increases, the full activation temperature increases. That is, as the degree of deterioration of the $NO_x$ catalyst 4 increases, a higher temperature is required to remove $NO_x$. And, as the degree of deterioration of the $NO_x$ catalyst 4 increases, the $NO_x$ removal rate expected when the full activation temperature is attained decreases.

Thus, as the degree of deterioration of the $NO_x$ catalyst 4 increases, the full activation temperature increases, so that the degree of deterioration of the $NO_x$ catalyst 4 can be determined by comparison between the full activation temperature expected with a new catalyst and the actual full activation temperature. Further, by using as the reference value the full activation temperature expected when the degree of deterioration of the $NO_x$ catalyst 4 is at the acceptable limit, the $NO_x$ catalyst 4 may be determined to be deteriorated when the actual full activation temperature is higher than the reference value. The higher the full activation temperature is than the reference value, the higher the degree of deterioration of the $NO_x$ catalyst 4.

Since the $NO_x$ removal rate varies depending on the ratio of $NO_2$ in the $NO_x$ which inflows into the $NO_x$ catalyst 4, the full activation temperature is preferably determined for each ratio of $NO_2$. Further, the full activation temperature expected when the ratio of $NO_2$ is within a specific range may be used. For example, since the full activation temperature decreases when the ratio of $NO_2$ in the $NO_x$ is 50% or a value close thereto, the chance of attainment of the full activation temperature increases. That is, by determining the full activation temperature expected when the ratio of $NO_2$ in the $NO_x$ is 50% or a value close thereto, the frequency of determination of the degree of deterioration of the $NO_x$ catalyst 4 can be increased.

Figure 12:
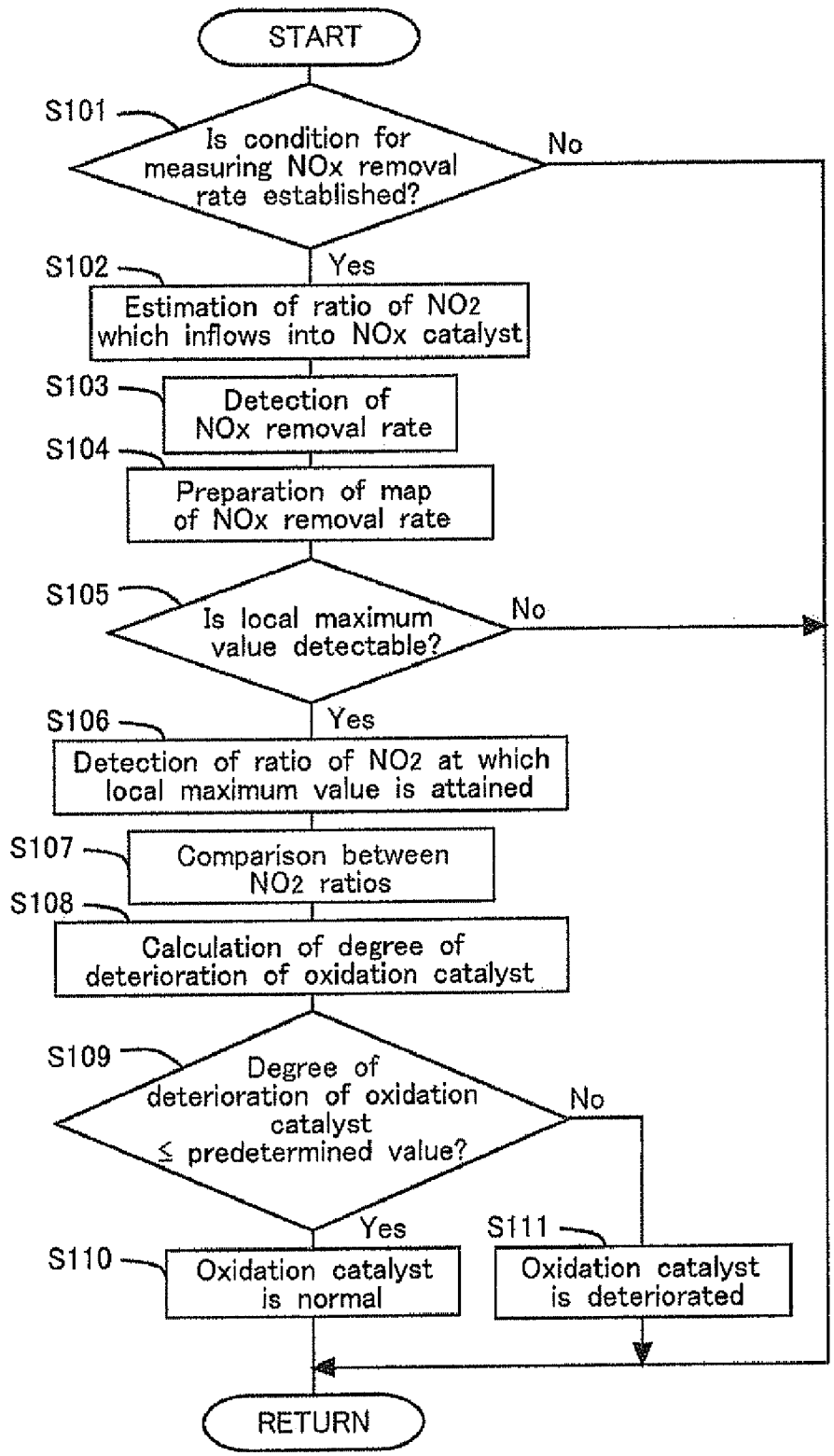
FIG. 12 is a flow chart showing the flow of the determination of deterioration of the oxidation catalyst according to the present embodiment.

FIG. 12 is a flow chart showing the flow of the determination of deterioration of the oxidation catalyst 3 according to the present embodiment. This routine is executed by ECU 10 repeatedly with predetermined time intervals. Further, this routine is executed prior to determination of deterioration of the NO catalyst 4. Further, this routine is executed when an appropriate amount of the reducing agent is supplied from the injection valve 5 to the $NO_x$ catalyst 4 based on the $NO_x$ concentration measured by the first $NO_x$ sensor 7 or the second $NO_x$ sensor 8.

In Step S101, whether or not the condition for measuring the $NO_x$ removal rate of the $NO_x$ catalyst 4 was established is determined. This condition is required for accurate determination of deterioration of the oxidation catalyst 3 and the $NO_x$ catalyst 4. For example, whether or not the temperature of the oxidation catalyst 3 is lower than T3 shown in FIG. 8 and the temperature of the $NO_x$ catalyst 4 is within the predetermined range (the range between T1 and T2 shown in FIG. 2) is judged. In cases where a positive judgment was made in Step S101, the process proceeds to the Step S102, whereas in cases where a negative judgment was made, the routine is terminated since deterioration of the oxidation catalyst 3 and the $NO_x$ catalyst 4 cannot be judged.

In Step S102, the ratio of $NO_2$ in the $NO_x$ which inflows into the $NO_x$ catalyst 4 is estimated under the assumption that the degree of deterioration of the oxidation catalyst 3 is at a predetermined value. That is, the ratio of $NO_2$ is determined based on the map shown in FIG. 5. It should be noted that, in the present embodiment, ECU 10 which processes the Step S102 corresponds to the estimation unit of the present invention. Further, in the present embodiment, the Step S102 corresponds to the first step of the present invention.

In Step S103, the $NO_x$ removal rate of the $NO_x$ catalyst 4 is detected. That is, from the $NO_x$ concentrations obtained by the first $NO_x$ sensor 7 and the second $NO_x$ sensor 8, the $NO_x$ removal rate is calculated. Defining the $NO_x$ concentration obtained by the first $NO_x$ sensor 7 as the upstream $NO_x$ concentration, and the $NO_x$ concentration obtained by the second $NO_x$ sensor 8 as the downstream $NO_x$ concentration, the $NO_x$ removal rate can be calculated by the following equation.

$$NO_x \text{ removal rate} = (\text{upstream } NO_x \text{ concentration} - \text{downstream } NO_x \text{ concentration})/(\text{upstream } NO_x \text{ concentration}).$$

The $NO_x$ removal rate may also be calculated using the amount of $NO_x$ which passes through each sensor in a unit time, which amount of $NO_x$ is calculated based on the $NO_x$ concentration obtained by the sensor.

In Step S104, points determined by the $NO_2$ rate obtained in the Step S102 and the $NO_x$ removal rate obtained in the Step S103 are plotted in the map shown in FIG. 6.

In Step S105, whether or not a local maximum value of the $NO_x$ removal rate can be obtained is determined. For example, the number of points required to obtain a local maximum value is determined in advance, and whether or not this number of points are plotted on the map is determined. Further, for example, an equation for calculation of a local maximum value may be stored in advance in ECU 10, and whether or not the number of points required for the calculation are plotted on the map may be determined.

In cases where a positive judgment was made in Step S105, the process proceeds to step S106, whereas in cases where a negative judgment was made, the routine is terminated. In the present embodiment, ECU 10 which processes the Steps 103 to 105 corresponds to the calculation unit of the present invention. Further, in the present embodiment, the Steps 103 to 105 correspond to the second step of the present invention.

In Step S106, the ratio of $NO_2$ at which the $NO_x$ removal rate reaches a local maximum value is determined. That is, from the map shown in FIG. 7, a local maximum value is read, and the ratio of $NO_2$ corresponding to this local maximum value is read.

In Step 107, the ratio of $NO_2$ at which the $NO_x$ removal rate reaches a local maximum value and the reference value (50%, for example) are compared. For example, the extent of the shift of the ratio of $NO_2$ at which the $NO_x$ removal rate reaches a local maximum value, from the reference value, is determined. That is, the difference or the ratio between the ratio of $NO_2$ at which the $NO_x$ removal rate reaches a local maximum value and the reference value is calculated.

In Step 108, the degree of deterioration of the oxidation catalyst 3 is calculated. This degree of deterioration is a value indicating the extent of deterioration by comparison with a new catalyst. The relationship between: the difference or the ratio between the ratio of $NO_2$ at which a local maximum value is attained and the reference value, determined in the Step S107; and the degree of deterioration of the oxidation catalyst 3; is determined in advance. A correction value for correcting the ratio of $NO_2$ estimated in the Step S102 may be determined. Further, the map shown in FIG. 5 may be corrected. The difference or the ratio between the ratio of $NO_2$ at which a local maximum value is attained and the reference value, determined in the Step S107, may be regarded as the degree of deterioration of the oxidation catalyst 3. In cases where the predetermined value used in the Step S102 is regarded as the acceptable limit, whether the ratio of $NO_2$ at which a local maximum value is attained is higher or lower than 50% may be determined.

In Step S109, whether or not the degree of deterioration of the oxidation catalyst 3 is not more than the predetermined value is determined. The term "predetermined value" herein means the value at which the degree of deterioration of the oxidation catalyst 3 reaches the acceptable limit. This predetermined value is determined in advance. In cases where the predetermined value of the degree of deterioration used in the Step S102 is used as the acceptable limit, the oxidation catalyst 3 can be determined to be normal when the ratio of $NO_2$ at which the NO removal rate reaches a local maximum value is lower than 50%. Further, the oxidation catalyst 3 can be determined to be deteriorated when the ratio of $NO_7$ at which the $NO_x$ removal rate reaches the local maximum value is higher than 50%.

In cases where a positive judgment was made in the Step S109, the process proceeds to Step S110, whereas in cases where a negative judgment was made, the process proceeds to Step S111. In the present embodiment, ECU 10 which processes the Step S109 corresponds to the determination unit of the present invention. Further, in the present embodiment, the Step S109 corresponds to the third Step of the present invention.

In the Step S110, the oxidation catalyst 3 is determined to be normal.

In the Step S111, the oxidation catalyst 3 is determined to be deteriorated. In this case, the operator or the like may be alerted that the oxidation catalyst 3 is abnormal.

Figure 13:
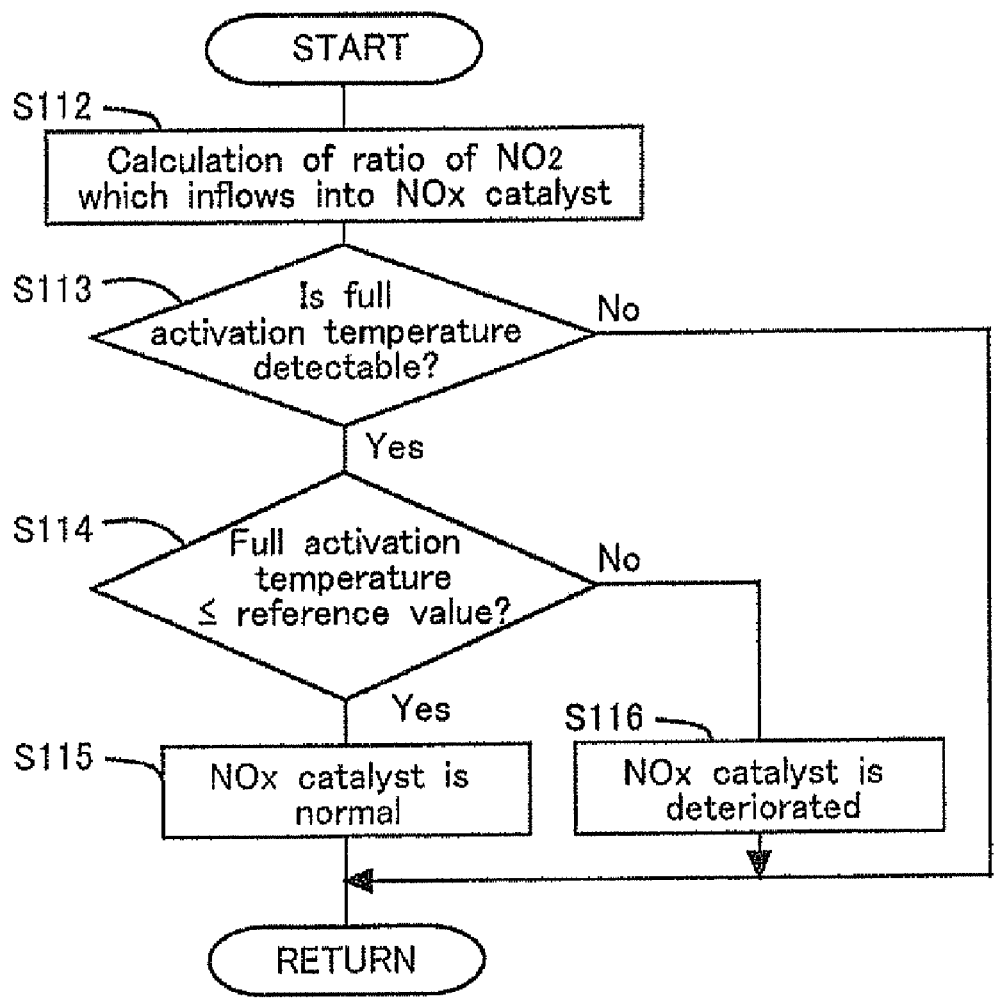
FIG. 13 is a flow chart showing the flow of the determination of deterioration of the $NO_x$ catalyst according to the present embodiment.

FIG. 13 is a flow chart showing the flow of the determination of deterioration of the $NO_x$ catalyst 4 according to the present embodiment. This routine is executed after the determination of deterioration of the oxidation catalyst 3 shown in FIG. 12.

In Step S112, the ratio of $NO_2$ in the $NO_x$ which inflows into the $NO_x$ catalyst 4 is calculated based on the degree of deterioration of the oxidation catalyst 3. That is, the map shown in FIG. 5 is corrected to obtain a corrected ratio of $NO_2$. This may be used as the actual $NO_2$ ratio. In the present embodiment, ECU 10 which processes the Step S112 corresponds to the ratio calculation unit of the present invention. Further, in the present embodiment, the Step S112 corresponds to the fourth step of the present invention.

In Step S113, whether or not the full activation temperature of the NO catalyst 4 is detectable is determined. In this step, whether or not the $NO_x$ removal rate hardly changed even when the temperature of the $NO_x$ catalyst 4 changed is determined. For example, in cases where the rate of change of the $NO_x$ removal rate of the $NO_x$ catalyst 4 is not more than a predetermined value in spite of increase in the temperature of the $NO_x$ catalyst 4, the full activation temperature is determined to be detectable. This determination is carried out when the ratio of $NO_2$ is within a predetermined range.

In cases where a positive judgment was made in the Step S113, the process proceeds to Step S114, whereas in cases where a negative judgment was made, this routine is terminated to continue to obtain the temperature data. In the present embodiment, ECU 10 which processes the Step S113 corresponds to the activity determination unit of the present invention. Further, in the present embodiment, the Step S113 corresponds to the fifth step of the present invention.

In Step S114, whether or not the full activation temperature is not more than the reference value is determined. This reference value is the value at which the degree of deterioration of the $NO_x$ catalyst 4 reaches the acceptable limit. This predetermined value is determined in advance by an experiment or the like.

In cases where a positive judgment was made in the Step S114, the process proceeds to Step S115, whereas in cases where a negative judgment was made, the process proceeds to Step S116. In the present embodiment, ECU 10 which processes the Step S114 corresponds to the $NO_x$ catalyst deterioration determination unit of the present invention. Further, in the present embodiment, the Step S114 corresponds to the sixth step of the present invention.

In Step S115, the $NO_x$ catalyst 4 is determined to be normal.

In Step S116, the $NO_x$ catalyst 4 is determined to be deteriorated. In this case, the operator or the like may be alerted that the $NO_x$ catalyst 4 is abnormal.

The full activation temperature expected with a new catalyst may be regarded as the reference value, and based on the difference between the detected full activation temperature and the reference value, the degree of deterioration of the $NO_x$ catalyst 4 may be determined. In this case, the larger the difference is, the higher the degree of deterioration.

As described above, by the present embodiment, the ratio of $NO_2$ in the $NO_x$ which inflows into the $NO_x$ catalyst 4 can be determined more accurately since the degree of deterioration of the oxidation catalyst 3 is first determined. Therefore, the removal rate of the $NO_x$ catalyst 4 can be determined more accurately, so that the degree of deterioration of the $NO_x$ catalyst 4 can be determined more accurately.

The invention claimed is:

1. A device for determining deterioration of a catalyst, said device comprising:
   an $NO_x$ selective reduction catalyst which is disposed at an exhaust passage of an internal combustion engine and selectively reduces $NO_x$ with a reducing agent;
   a catalyst which is disposed at a location upstream of said $NO_x$ selective reduction catalyst and has an oxidizing ability;
   a reducing agent supplying unit for supplying the reducing agent to exhaust gas at a location upstream of said $NO_x$ selective reduction catalyst;
   an upstream detection unit for detecting the $NO_x$ concentration at a location downstream of said catalyst having an oxidizing ability and upstream of said $NO_x$ selective reduction catalyst; and
   a downstream detection unit for detecting the $NO_x$ concentration in exhaust gas at a location downstream of said $NO_x$ selective reduction catalyst; and comprising:
   an estimation unit for estimating the ratio of $NO_2$ in the $NO_x$ which inflows into said $NO_x$ selective reduction catalyst under the assumption that the degree of deterioration of said catalyst having an oxidizing ability is at a predetermined value;
   a calculation unit for calculating the $NO_x$ removal rate of said $NO_x$ selective reduction catalyst a plurality of times at least until a local maximum value is obtained, which calculation is carried out based on the $NO_x$ concentrations detected by said upstream detection unit and said downstream detection unit when the reducing agent was supplied by said reducing agent supplying unit; and
   a determination unit for determining the degree of deterioration of said catalyst having an oxidizing ability, which unit is carried out by comparison between the ratio of $NO_2$ estimated by said estimation unit when the $NO_x$ removal rate of said $NO_x$ selective reduction catalyst reaches a local maximum value and a reference value of said ratio.

2. The device for determining deterioration of a catalyst, according to claim 1, said device comprising a temperature detection unit for detecting the temperature of said $NO_x$ selective reduction catalyst,
   wherein said calculation unit calculates the $NO_x$ removal rate when the temperature detected by said temperature detection unit is within a predetermined range.

3. The device for determining deterioration of a catalyst, according to claim 1, said device comprising:
   a temperature detection unit for detecting the temperature of said $NO_x$ selective reduction catalyst;
   a ratio calculation in unit for calculating the ratio of $NO_2$ in the $NO_x$ which inflows into said $NO_x$ selective reduction catalyst, which calculation is carried out based on the degree of deterioration determined by said determination unit;
   an activity determination unit for determining that the temperature of said $NO_x$ selective reduction catalyst reached the full activation temperature, which determination is carried out based on the temperature detected by said temperature detection unit; and
   an $NO_x$ catalyst deterioration determination unit for determining the degree of deterioration of said $NO_x$ selective reduction catalyst by comparison between: said full activation temperature observed when the ratio of $NO_2$ calculated by said ratio calculation unit is within a predetermined range; and a reference value of the full activation temperature.

4. The device for determining deterioration of a catalyst, according to claim 1, wherein:
   said estimation unit estimates the ratio of $NO_2$ using the predetermined value of the degree of deterioration of said catalyst having an oxidizing ability as the acceptable limit; and
   said determination unit determines the degree of deterioration of said catalyst having an oxidizing ability as exceeding the acceptable limit in cases where the ratio of $NO_2$ estimated by said estimation unit when the $NO_x$ removal rate of said $NO_x$ selective reduction catalyst reaches a local maximum value is higher than a reference value.

5. The device for determining deterioration of a catalyst, according to claim 2, wherein:

said estimation unit estimates the ratio of $NO_2$ using the predetermined value of the degree of deterioration of said catalyst having an oxidizing ability as the acceptable limit; and said determination unit determines the degree of deterioration of said catalyst having an oxidizing ability as exceeding the acceptable limit in cases where the ratio of $NO_2$ estimated by said estimation unit when the $NO_x$ removal rate of said $NO_x$ selective reduction catalyst reaches a local maximum value is higher than a reference value.

6. The device for determining deterioration of a catalyst, according to claim 3, wherein:

in said $NO_x$ catalyst deterioration determination unit, the reference value of said full activation temperature is set to the full activation temperature expected when the degree of deterioration of said $NO_x$ selective reduction catalyst is at the acceptable limit; and the degree of deterioration of said $NO_x$ selective reduction catalyst is determined as exceeding the acceptable limit in cases where said full activation temperature is higher than the reference value.

7. A method for determining deterioration of a catalyst, said method comprising:

a first step wherein, under the assumption that the degree of deterioration of a catalyst which is disposed at a location upstream of an $NO_x$ selective reduction catalyst and has an oxidizing ability is at a predetermined value, the ratio of $NO_2$ in the $NO_x$ which inflows into the $NO_x$ selective reduction catalyst is estimated;

a second step wherein the $NO_x$ removal rate of said $NO_x$ selective reduction catalyst is calculated a plurality of times at least until a local maximum value is obtained; and a third step wherein the degree of deterioration of said catalyst having an oxidizing ability is determined by comparison between: the ratio of $NO_2$ obtained in said first step when the $NO_x$ removal rate of said $NO_x$ selective reduction catalyst reaches a local maximum value; and a reference value of said ratio.

8. The method for determining deterioration of a catalyst, according to claim 7, said method comprising:

a fourth step wherein the ratio of $NO_2$ in the $NO_x$ which inflows into said $NO_x$ selective reduction catalyst is calculated based on the degree of deterioration of the catalyst having an oxidizing ability, which degree of deterioration is determined in said third step;

a fifth step wherein, based on the ratio of $NO_2$ calculated in said fourth step, the removal rate by said $NO_x$ selective reduction catalyst is detected a plurality of times at least until the full activation temperature is obtained; and a sixth step wherein the degree of deterioration of said $NO_x$ selective reduction catalyst is determined by comparison between: the full activation temperature obtained in said fifth step when the ratio of $NO_2$ calculated in said fourth step is within a predetermined range; and a reference value of the full activation temperature.

* * * * *